United States Patent
Wang et al.

(10) Patent No.: US 12,409,550 B2
(45) Date of Patent: Sep. 9, 2025

(54) ROBOT SYSTEM WITH CASING ELEMENTS

(71) Applicant: Mantis Robotics, Inc., Danville, CA (US)

(72) Inventors: Pei Jui Wang, New Taipei (TW); Gerry Vannuffelen, Danville, CA (US)

(73) Assignee: Mantis Robotics, Inc., Danville, CA (US)

(*) Notice: Subject to any disclaimer, the term of this patent is extended or adjusted under 35 U.S.C. 154(b) by 282 days.

(21) Appl. No.: 18/151,603

(22) Filed: Jan. 9, 2023

(65) Prior Publication Data
US 2023/0219218 A1 Jul. 13, 2023

Related U.S. Application Data

(60) Provisional application No. 63/266,727, filed on Jan. 12, 2022.

(51) Int. Cl.
| | | |
|---|---|---|
| *B25J 9/16* | (2006.01) | |
| *B25J 13/08* | (2006.01) | |
| *B25J 19/02* | (2006.01) | |

(52) U.S. Cl.
CPC ............ *B25J 9/1633* (2013.01); *B25J 9/161* (2013.01); *B25J 9/1664* (2013.01); *B25J 13/084* (2013.01); *B25J 13/089* (2013.01); *B25J 19/026* (2013.01)

(58) Field of Classification Search
CPC ........ B25J 9/1633; B25J 9/161; B25J 9/1664; B25J 13/084; B25J 13/089; B25J 19/026; B25J 13/086; B25J 13/085; B25J 9/1676; B25J 9/1694; B25J 13/025; B25J 13/088
See application file for complete search history.

(56) References Cited

U.S. PATENT DOCUMENTS

| | | | | |
|---|---|---|---|---|
| 6,028,410 | A * | 2/2000 | Leavitt | G05B 19/404 700/250 |
| 8,095,200 | B2 * | 1/2012 | Quaid, III | B25J 9/0081 600/407 |
| 9,043,025 | B2 | 5/2015 | Brooks et al. | |
| 9,403,276 | B2 | 8/2016 | Nishimura et al. | |
| 9,475,200 | B2 | 10/2016 | Schlaich et al. | |
| 9,477,350 | B2 | 10/2016 | Sheng et al. | |

(Continued)

FOREIGN PATENT DOCUMENTS

| | | | | |
|---|---|---|---|---|
| CN | 108602187 A | * | 9/2018 | ......... B23K 26/0884 |
| DE | 102008063081 | | 10/2014 | |

(Continued)

OTHER PUBLICATIONS

DE-102017103568-B3 translation (Year: 2017).*

(Continued)

*Primary Examiner* — Kyle T Johnson

(57) ABSTRACT

A robot system comprising movable parts, a casing element, a force limiting sensor, a joint position sensor, and one or more processors, wherein the casing element comprises a vibration actuator. Multiple embodiments are introduced for the implementation of the casing element include haptic warning and proximity sensing. Furthermore, means to use the casing element to guide the robot and generate haptic effect by the vibration actuator to assist the user in a human-robot collaboration and/or guiding function are also disclosed.

20 Claims, 11 Drawing Sheets

(56) References Cited

U.S. PATENT DOCUMENTS

| | | | |
|---|---|---|---|
| 9,566,125 B2* | 2/2017 | Bowling | B25J 9/161 |
| 9,977,120 B2 | 5/2018 | Carter et al. | |
| 10,144,125 B2 | 12/2018 | Su et al. | |
| 10,245,729 B2 | 4/2019 | Bordegnoni et al. | |
| 10,295,331 B2 | 5/2019 | Albert et al. | |
| 10,518,424 B2 | 12/2019 | Zillich | |
| 10,639,799 B2 | 5/2020 | Katou et al. | |
| 10,675,767 B2 | 6/2020 | Takaoki | |
| 10,710,252 B2 | 7/2020 | Roziere et al. | |
| 10,800,032 B2 | 10/2020 | Kamisono et al. | |
| 10,828,791 B2 | 11/2020 | Fujita | |
| 10,976,460 B2 | 4/2021 | Neel et al. | |
| 11,014,240 B2 | 5/2021 | Cole et al. | |
| 11,204,644 B2 | 12/2021 | Long et al. | |
| 12,240,116 B2* | 3/2025 | Amo | B25J 9/1633 |
| 2010/0318223 A1* | 12/2010 | Motoyoshi | B25J 9/1638 700/258 |
| 2015/0366629 A1* | 12/2015 | Bowling | A61B 34/20 606/34 |
| 2017/0080562 A1* | 3/2017 | Tsuzaki | B25J 13/085 |
| 2018/0168759 A1* | 6/2018 | Kilroy | B25J 13/086 |
| 2018/0361594 A1* | 12/2018 | Haddadin | B25J 9/1656 |
| 2019/0061155 A1* | 2/2019 | Hashimoto | B25J 9/1666 |
| 2019/0270199 A1 | 9/2019 | Ning et al. | |
| 2019/0366544 A1* | 12/2019 | Oka | B25J 9/1666 |
| 2019/0368658 A1* | 12/2019 | Sato | B25J 19/027 |
| 2020/0086485 A1* | 3/2020 | Johnson | B25J 9/1682 |
| 2020/0130623 A1 | 4/2020 | Baldinger et al. | |
| 2020/0180151 A1* | 6/2020 | Ryan | B25J 9/1664 |
| 2020/0368924 A1 | 11/2020 | Neel et al. | |
| 2020/0397519 A1* | 12/2020 | Ueyama | A61B 17/00 |
| 2021/0046642 A1* | 2/2021 | Luis y Prado | B25J 11/0055 |
| 2021/0085424 A1* | 3/2021 | Hulford | A61B 34/35 |
| 2021/0114211 A1* | 4/2021 | Knott | B25J 19/063 |
| 2021/0370509 A1* | 12/2021 | Pivac | B25J 13/089 |
| 2022/0212340 A1* | 7/2022 | Hasegawa | B25J 9/163 |
| 2023/0219218 A1* | 7/2023 | Wang | B25J 9/1676 700/245 |
| 2023/0256606 A1* | 8/2023 | Wang | B25J 19/027 700/255 |
| 2023/0405821 A1* | 12/2023 | Agrawal | B25J 9/1674 |
| 2024/0109179 A1* | 4/2024 | Sakamachi | B25J 9/102 |
| 2024/0111357 A1* | 4/2024 | Noohi Bezanjani | A61B 34/74 |

FOREIGN PATENT DOCUMENTS

| | | | | |
|---|---|---|---|---|
| DE | 102013020596 | | 6/2015 | |
| DE | 102017103568 | | 12/2017 | |
| DE | 102017103568 B3 * | 12/2017 | | F16P 3/142 |
| DE | 102018219268 | | 3/2020 | |
| EP | 3623115 A1 * | 3/2020 | | B25J 9/1612 |
| FR | 3115719 | | 5/2022 | |
| WO | 2020049230 | | 3/2020 | |
| WO | 2021099042 | | 5/2021 | |
| WO | WO-2022144640 A1 * | 7/2022 | | A61B 34/30 |

OTHER PUBLICATIONS

Shared-planning-and-control-for-mobile-robots-with-integral-haptic-feedback (Year: 2018).*
CN-108602187-A translation (Year: 2018).*

* cited by examiner

ROBOT SYSTEM WITH CASING ELEMENTS

This application claims the benefit of U.S. Provisional Patent Application No. 63/266,727, filed Jan. 12, 2022, which is hereby incorporated by reference herein in its entirety.

FIELD

This disclosure relates to robotic systems and, more particularly, to safety systems for robots in human-robot collaboration.

BACKGROUND

Human-robot collaboration (HRC) is increasingly important in the development of industrial robots for better flexibility, ease-of-use, and physical footprint reduction in the manufacturing industry. Some robots for HRC are equipped with proximity or touch sensors to detect humans nearby, to reduce the risk of personal injury caused by the robot. Yet there are still many problems that arise in practice, including but not limited to error-triggering and efficiency and safety to guide the robot. Therefore, there is a need for improved robots that solve these problems and provide a higher efficiency and safety to the HRC.

SUMMARY

A robot system is provided that includes movable parts having a base and a tool end; at least one actuator configured to drive at least one of the movable parts; a force limiting sensor; a casing element equipped on at least one of the movable parts; a joint position detection element coupled to at least one of the actuators; and one or more processors configured to measure a speed of the movable parts using the joint position detection element, to stop motion of the movable parts when the measured speed exceeds a speed limit, and to stop motion of the movable parts when the measured force exceeds a force limit.

Multiple embodiments are disclosed. The casing element can further include a sensor configured to detect a vibration generated by a vibration sensor for performing a proximity detection or a contact detection to an external object. The casing element can be configured to generate a haptic effect to warn a user in HRC. The one or more processors can be configured to control the motion of the movable parts according to a detection result of the proximity detection, as a guiding function of the robot. The casing element can generates a haptic effect as a support in the guiding or to form a two-dimensional or three-dimensional pattern in a set position on the casing element that is in conjunction with the position of the gesture to be detected and to operate.

DETAILED DESCRIPTION

The following description provides specific details for a thorough understanding of and enabling description for the disclosed embodiments. One of ordinary skill in the art will understand that one or more embodiments may be practiced without one or more of such specific details. In some instances, specific description of well-known structures or functions may have been omitted to avoid unnecessarily obscuring the description of the embodiments.

Unless the context clearly requires otherwise, the words "comprise," "comprising," and the like are to be construed in an inclusive sense as opposed to an exclusive or exhaustive sense. The words "herein," "above," "below", when used in this description, refer to this description as a whole and not to any particular portions of this description. When the claims use the word "or" in reference to a list of two or more items, that word covers all of the following interpretations of the word: any of the items in the list, all of the items in the list, and any combination of the items in the list. When the word "each" is used to refer to an element that was previously introduced as being at least one in number, the word "each" does not necessarily imply a plurality of the elements but can also mean a singular element.

Figure 1:
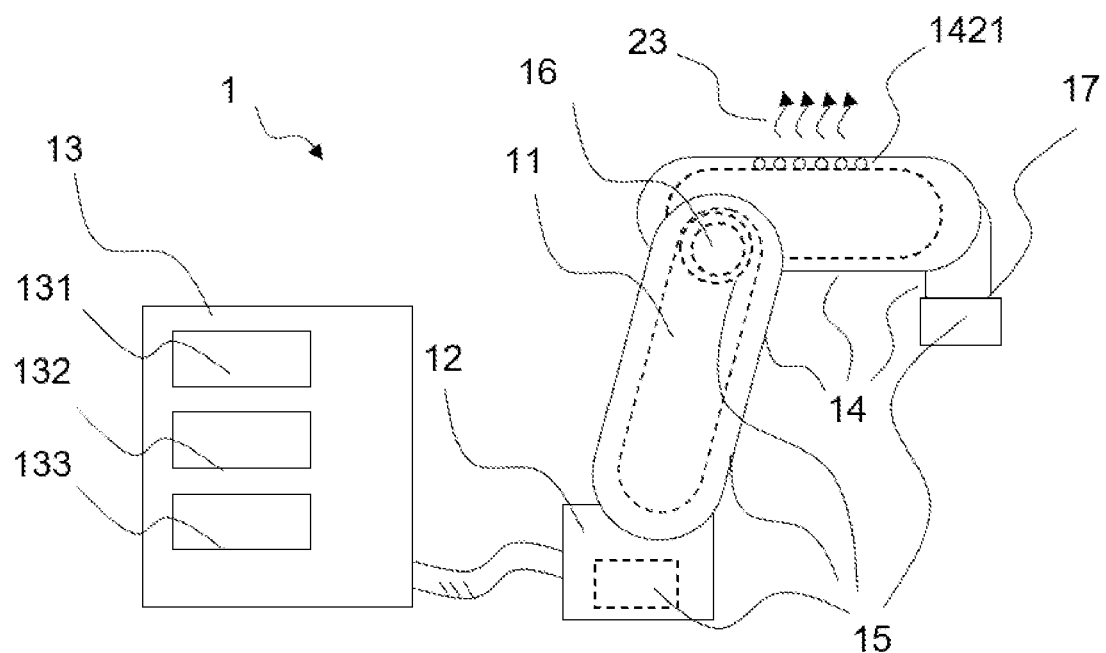
FIG. 1 is a diagram of an illustrative robot system in accordance with some embodiments.

FIG. 1 is a diagram of an illustrative robot system (sometimes referred to herein as a robotic system or an industrial robot system). As shown in FIG. 1, the robot system may include a robot such as robot 1 (e.g., a robotic arm). Robot 1 may include one or more (e.g., multiple) movable parts 11. Movable parts 11 may be actuated by actuators, for example. Movable parts 11 may sometimes be referred to herein as movable members 11, movable components 11, movable segments 11, or movable portions 11 of robot 1. Each movable part 11 may include a rigid housing or frame, for example.

Robot 1 may include a support structure such as mounting base 12. At least one movable part 11 may be mounted to mounting base 12. Robot 1 may include control equipment such as controller 13. Controller 13 may, for example, include one or more processors (e.g., central processing units (CPUs), graphics processing units (GPUs), integrated circuits (ICs), application specific integrated circuits (ASICs), microprocessors, etc.) and storage such as storage device 133 (e.g., storage circuitry, non-volatile memory, volatile memory, one or more hard drives, solid state drives, read-only memory, flash memory, etc.). Storage device 133 may store processing instructions such as software code. The one or more processors may control the operations of robot 1 and/or one or more components of the robot system by running or executing code stored on storage device 133. Controller 13 may include a motion control module 131 (sometimes referred to herein as motion controller 131, motion control processor 131, motion control circuitry 131, or motion control engine 131) and a safety control module 132 (sometimes referred to herein as safety controller 132, safety control processor 132, safety control circuitry 132, or safety control engine 132). If desired, controller 13 may receive user input from a user or operator of robot 1 or the robot system (e.g., via a user input device such as a touch screen, mouse, keyboard, joystick, remote control accessory, etc.). Controller 13 may also generate output for the user (e.g., audio output, visual output on a display or other visual indicator, haptic or vibrational output, etc.).

Motion control module 131 and the safety control module 132 may include, for example, a central processing unit (CPU), digital signal processor (DSP), microcontroller unit (MCU), ASIC, and/or field programmable gate array (FPGA), may include two individual hardware modules, and may include a two software module or system in the same CPU, DSP, MCU, ASIC, FPGA under a management of a hypervisor software to ensure the non-safety part (e.g., the motion control module) will not affect the safety part, etc.

Robot 1 may also include one or more (e.g., multiple) casing elements 14. Casing elements 14 may be equipped on (e.g., disposed on, affixed to, enclosing, adhered to, attached to, mounted to, surrounding, covering, etc.) one or more movable parts 11 and may form part of the casing, housing, enclosure, frame, or shell of moveable part(s) 11. If desired, casing elements 14 may cover some, substantially all, or all of one or more of movable parts 11 (e.g., casing elements 14 may enclose the components of the respective movable parts 11 and may form exterior surfaces of movable parts 11). Casing element 14 may sometimes be referred to herein as casing 14, housing 14, sensing casing element 14, sensing casing 14, sensing housing 14, a casing 14 with object detection capabilities, a housing 14 with object detection capabilities, a casing for movable part(s) 11 that performs object detection/sensing and/or haptic feedback, a housing for moveable part(s) 11 that performs object detection/sensing and/or haptic feedback, etc. Two or more movable parts 11 may be coupled together at a joint. The two or more movable parts may be movable (e.g., translatable, rotatable, etc.) with respect to each other about the joint. For example, two movable parts 11 may be coupled together and movable/rotatable about an elbow joint.

One or more movable parts 11 may have a tool end 17 (e.g., the end of the robot opposite mounting base 12). The tool end may include tool mounting structures that are configured to receive one or more tools to be mounted to robot 1. Robot 1 may perform any desired operations using the tool(s) mounted at the tool end (e.g., industrial operations, machining operations, manufacturing operations, sensing operations, mechanical operations, etc.). Robot 1 may include one or more joint monitoring elements 16 (sometimes referred to herein as joint position detecting element 16 or joint position detector 16). Casing elements 14 and joint monitoring elements 16 may be communicably coupled to safety control module 132 (e.g., via one or more wired and/or wireless links). For example, controller 13 may be coupled to robot 1 via one or more data, control, and/or power lines (e.g., over one or more cables). Controller 13 may send control signals that control the operation of robot 1 over the one or more cables. Controller 13 may receive signals from robot 1 (e.g., object detecting elements 14 and joint monitoring elements 16) over the one or more cables.

Joint monitoring elements 16 may include encoders mounted on an actuator of the joint and/or current/pulse monitoring components in the servo drivers of the actuators for movable parts 11. Joint monitoring elements 16 may generate (detect) speed and position information associated with the joints. Joint monitoring elements 16 may transmit the speed and position information to safety control module 132. Joint monitoring elements 16 may sometimes be referred to herein as joint monitoring components 16 or joint monitors 16.

In HRC, there are different approaches to reduce the hazard that a robot may bump into a human or harm a human. Speed and separation monitoring is a technique to reduce this hazard in HRC by monitoring the separation distance between a robot and a human, and to adjust the speed of the robot according to the separation distance, so that robot always stops before contacting the human. But there are many difficulties to rely only the monitored separation distance to a human to achieve a safe HRC. One difficulty is that technologies like proximity sensing may be shuttered by all kinds of obstacles in the field, including the tool mounted by the user on the tool end of robot, and the workpieces that a robot may need to grip. Another difficulty is many sensing technologies are unable to distinguish a human body from other non-human external objects (e.g., walls, table surfaces that the robot needs to work on, etc.) which may not be subject to the same stringent safety requirements.

Although some technologies may be used to monitor the position of the human user (e.g., image sensors that utilize an image processing algorithm to recognize a human body), such technologies usually need to have sufficient information to be able to recognize the human body (e.g., to recognize a human by limbs or other body features in the image). It can be difficult for such systems to function properly when a human is very close to the robot (e.g., due to the limited field of view of image sensors), which can force the robot to stop unnecessarily, thereby limiting efficiency or productivity of the HRC. Furthermore, there are needs for human to co-work with a robot in the same space, and even to have interactions with a robot, such as by picking workpieces handled by a robot or guiding a robot in a task. Speed and separation monitoring may be insufficient in these scenarios.

Power and force limiting (PFL) is another technique in HRC that helps to solve some of the limitations of speed and separation monitoring. PFL may include limiting the bumping or clamping force to below exceeding a reference of allowance of the bumping or clamping force for human body regions, or other values introduced by a risk assessment.

As shown in FIG. 1, to perform PFL in HRC, one or more force limiting sensing elements 15 may be equipped on robot 1. Force limiting sensing elements 15 may include a joint current sensor that can monitor the current of the actuator of a joint of robot 1 to detect bumping force according to the current of actuator, a joint torque sensor attached to a joint that can directly detect the torque of a joint, a force-torque sensor mounted to the tool end of the movable parts or the base of the robot 1. If desired, the force limiting sensing elements 15 may include a proximity sensor, an ultrasonic sensor, a pressure sensor, and/or a fluid pressure sensor arranged on top, beneath, or within a deformable structure mounted in one or more casing elements 14, to detect the force by monitoring one of the output of the sensors related to the deformation of the deformable structure (e.g., by measuring air pressure in a deformable air chamber, detecting the irrupting depth of an external object to a deformable structure with a capacitive sensor displaced between the deformable structure and a moving part of the robot, etc.) and/or using a contact sensitive sensor on top of a deformable structure to stop the robot according to a set speed of robot.

In the case of PFL, the bumping force may relate to the reaction time of the safety sensor and system (the time needed from the occurrence of a bumping to the initialization of the stop of motion, for example), the speed of the robot (which affects the distance robot moves during the reaction time—the period that the robot moves in original speed before the initialization of the stop of motion), and the stopping performance. The stopping performance of a robot, or the stopping distance and stopping time of a robot are further determined by a combination of the robot's motion speed, the pose or the reach of the robot, and the payload of the robot in the tool end, in each application. Higher speed, reach, and payload generally leads to a higher stopping time and stopping distance than lower speeds, reaches, and payloads. Since in a set work (task) assigned to the robot, both the pose or the reach of the robot in a sequence of motion and the payload of the robot should follow the intention of the automation process or the set programming, the robot system may only be able to control and adjust for HRC via adjusting motion speed. So, in an HRC scenario, a "collaborative speed" should be performed and monitored safely. Exceeding the collaborative speed may cause a worse bumping result that may result in a hazard or harm to a user.

The speed of specific points on the robot's movable parts can be monitored by safety control module 132 according to the information received from joint monitoring elements 16 and the kinematics of the robot. Such points may sometimes be referred to herein as speed monitoring points. The speed monitoring points may include the tool center point (TCP) of the robot, convex points of each joint, the elbow of the robot, the tool mounted on tool end 17 of the robot, and/or the convex points of the gripped objects by the tool, as examples.

In addition, the safety control module 132 may bypass the collaborative speed to the motion control module 131. Motion control module 131 (FIG. 1) may suppress or adjust the programmed speed of the robot to cause the speed of the speed monitoring points of the robot to remain lower than a safety limit. This may serve to reduce the likelihood of the robot triggering safety speed limits for regular programming under a certain collaborative speed limit (users don't need to consider the speed of one or more speed monitoring points in the programming) and to have a convenient safe collaborative application when the collaborative speed limit is enabled/disabled dynamically with safety field sensors such as light curtains, or when switching between different levels of collaborative speed limits.

If desired, to further reduce the hazard of HRC between a human and a robot with PFL, casing element 14 may include a vibration actuator 1421 (sometimes referred to herein as transmitter 1421 or vibrator 1421). Vibration actuator 1421 may generate a physical or mechanical vibration, for example, an ultrasonic wave, at or on the surface of casing element 14, or into the air within a certain distance from casing element 14. The vibration can provide a haptic effect to the user and can serve to warn the user when a moveable part of the robot is approaching, so as to further prevent a bumping event. By equipping a vibration detection sensor in the casing element (e.g., an ultrasonic sensor that detects a reflected ultrasonic wave from an external object or an ultrasonic surface wave sensor that detects disturbance of an ultrasonic surface wave on the casing element), the casing element can function as a proximity sensor and/or a contact sensor, which may further reduce the hazard in HRC with a PFL robot.

A casing element 14 equipped with vibration actuator 1421 may generate a haptic layer 23 in the air at, near, or close to casing element 14. While the robot is performing motion in HRC, and moves toward a person, or a person is moving his/her human body, for example, his/her hand, arm or shoulder toward the robot, the person may feel the haptics surrounding the casing element of the robot, allowing the person to step away or withdraw his/her body movement to prevent or minimize bumping to reduce the hazard further.

Compared to the case of bumping, clamping in HRC may bring further hazards to the human. A robot with only speed and separation monitoring has difficulty dealing with clamping because robots are forced to manipulate with workpieces, which inevitably creating clamping spaces, in most cases having zero gap (e.g., between the gripper and the workpiece, and between the manipulated workpiece and the jig, tray or table, in a pick-and-place application). A robot with PFL functions may function better in this scenario than robots that only have speed and separation monitoring functions. However, the human user's ability to extract themselves from a clamping situation is limited and may be difficult in practice.

Figure 2:
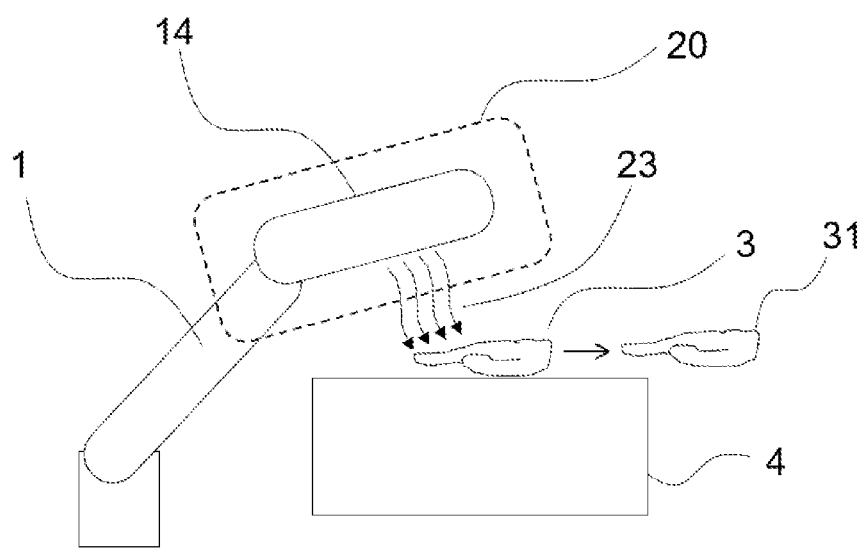
FIG. 2 is a diagram showing how an illustrative casing element can generate a haptic warning to a user in HRC in accordance with some embodiments.

FIG. 2 shows an example of a robot system having a haptic warning function in HRC in a scenario that may include a clamping hazard. As shown in FIG. 2, robot 1 may be set (e.g., programmed or otherwise configured) to approach a table 4 to perform a task such as picking up a workpiece from table 4. A person (e.g., a human user) may move his/her hand from position 31 to position 3, without noticing that a movable part of the robot is approaching table 4. Casing element 14 equipped with vibration actuator 1421 may generate a haptic layer 23 in the air near or close to casing elements 14. At the same time, casing element 14 may detect external objects within a set (predetermined) distance threshold 20, or a touch (contact) to the surface of casing element 14. Although not noticing the robot is moving a movable part to approach the table, when the person moves his/her hand, the person may feel the haptics surround the casing of the robot and take action to step away or withdraw his/her body movement (for example, move his/her hand to position 31) to prevent the clamping hazard.

If desired, the properties of the haptic effect, for example, ON/OFF timing, the range or position of the haptic effect in the air, the magnitude of the haptic effect, the pulse shape of the haptic effect, and/or the frequency of the haptic effect may be set according to (based on) the speed of the robot 1. The speed may be a fixed collaborative speed of robot 1, a switching collaborative speed of robot 1 that depends on if the position of a movable part of the robot is close to the environment objects (e.g., with clamping hazards that the robot further decrease its speed), or a dynamic changing collaborative speed considering the stopping ability (e.g., stopping time and stopping distance) of the pose of the robot in a continuous motion, so as to indicate different hazards.

Figure 3:
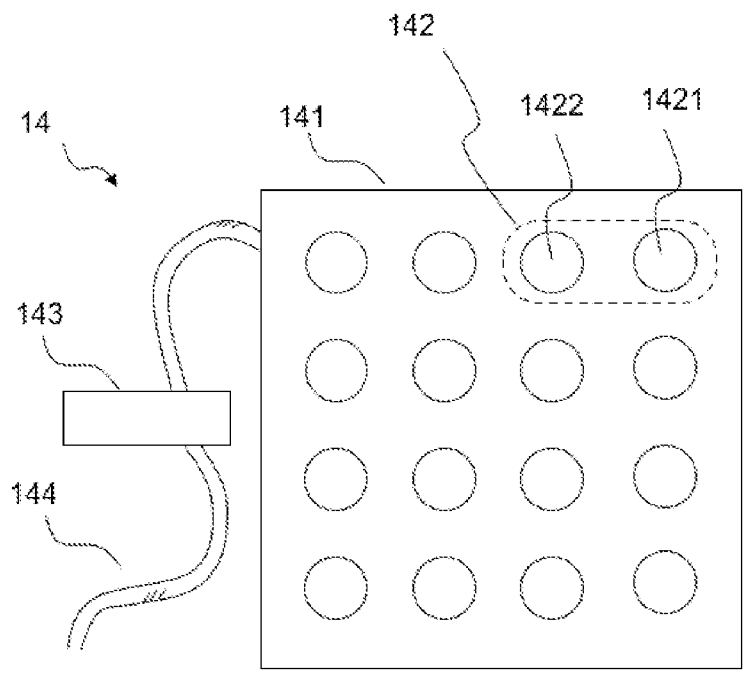
FIG. 3 is a diagram of an illustrative casing element in accordance with some embodiments.

FIG. 3 is a diagram of an illustrative casing element 14. As shown in FIG. 3, each casing element 14 may include any desired type of proximity and/or touch sensors. A casing element 14 having proximity sensors may monitor (e.g., continuously or periodically) the proximity (distance) of external objects with respect to movable part(s) 11 within a corresponding Field of View (FOV) and detection range. A casing element 14 having touch sensors may detect the external object when it touches the surface of the casing element.

As shown in FIG. 3, casing element 14 may include a physical structure such as support structure 141 (sometimes referred to herein as casing structure 141). Support structure 141 may carry one or more sensors 142 (sometimes referred to herein as object sensor 142 or object detecting sensing cells 142). Support structure 141 may be attached, adhered, or affixed to a corresponding movable part 11 on robot 1. If desired, support structure 141 may be formed from an integral part of movable part 11 (e.g., from a portion of a housing, shell, or frame of movable part 11). Casing element 14 may include one or more (e.g., multiple) object detecting sensing cells 142. Object detecting sensing cells 142 may sometimes be referred to herein as object detection sensing cells 142, object detection cells 142, object detecting cells 142, or object sensing cells 142. Object detecting sensing cells 142 may be arranged in a pattern, grid, or array. Each object detecting sensing cell 142 may have transducers including transmitter 1421 and/or receiver 1422. Transmitter 1421 and receiver 1422 may be disposed in a separated arrangement as in the example shown in FIG. 3, or in a co-axial arrangement (e.g., in which transmitter 1421 and receiver 1422 are arranged co-axially within a single cell 142).

Casing element 14 may also include an object detection processing module 143 (sometimes referred to herein as object detection processor 143, object detection processing engine 143, or object detection processing circuitry 143). Object detection processing module 143 may include MCU, DSP, ASIC, CPU or FPGA, as examples. Object detection processing module 143 may be communicably coupled to each of the object detecting sensing cells 142 on support structure 141. Object detecting sensing cells 142 may generate sensor signals in response to the proximity of one or more external objects (e.g., a user or part of the user's body) at, near, or adjacent to the corresponding movable part 11 on which casing element 14 is disposed. Object detecting sensing cells 142 may output (transmit) the sensor signals to object detection processing module 143. Object detection processing module 143 may process the sensing signals output by object detecting sensing cells 142 and may convert the sensing signals into digital information (data). Object detection processing module 143 may transmit the digital information to controller 13 over a data path such as safety rated filed bus 144. Safety rated filed bus 144 may communicably couple all the casing elements 14 on robot 1 together and to safety control module 132 in controller 13 (FIG. 1) to deliver sensing results to safety control module 132.

Figure 4:
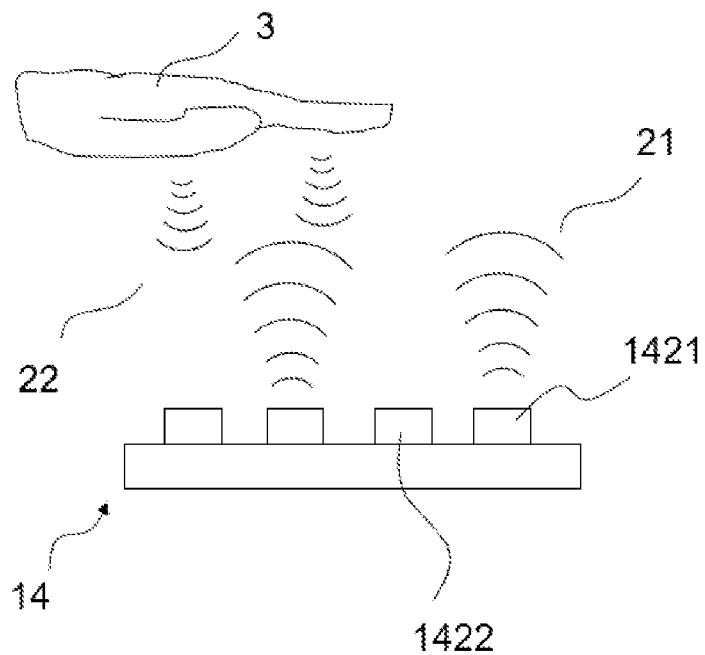
FIG. 4 is a diagram of an illustrative casing element that detects the echo of acoustic vibration in accordance with some embodiments.

FIG. 4 is a diagram showing one example of casing element 14, which may include an object sensing cell that detects external objects by generating an acoustic vibration and by receiving an echo of the vibration (e.g., an ultrasonic proximity sensor). In examples where casing element 14 includes an ultrasonic proximity sensor, object detecting sensing cells 142 (e.g., ultrasonic object detecting sensing cells) may include vibration actuator 1421 and vibration receiver 1422. Vibration actuator 1421 may include, for example, a piezoelectrical actuator that generates ultrasonic vibrations (e.g., vibrations at frequencies above the response of the human ear) through air and/or other media, as shown by ultrasonic wave 21. Receiver 1422 may include, for example, a piezoelectric transducer that receives reflected ultrasonic wave 22 (e.g., a version of ultrasonic wave 21 that has reflected, echoed, or bounced off of an external object such as external object 3) and that converts the received reflected ultrasonic wave into a corresponding electrical signal. Object detection processing module 143 may receive the signals generated by receiver 1422 and may process one or more characteristics of the reflected ultrasonic wave 22 to identify (e.g., compute, calculate, deduce, generate, etc.) the proximity distance between external object 3 and casing element 14. If desired, an array of object detecting sensing cells 142 may be used to generate an array of proximity distances between external object 3 and different points across casing element 14. The arrangement of the vibration actuator 1421 and the receiver 1422 may allow the casing element 14 to generate haptics and having proximity or touch detection at the same time.

Figure 5:
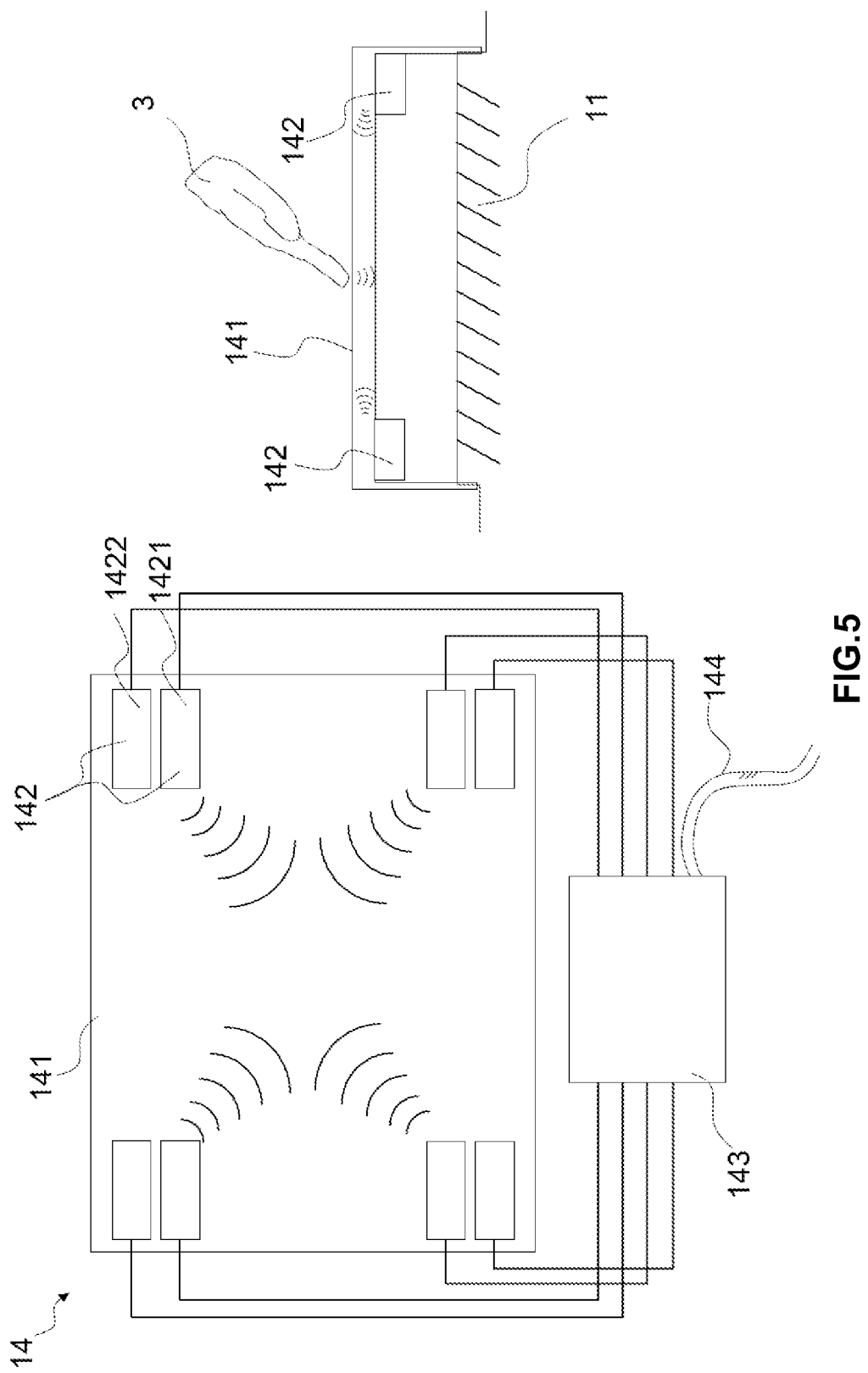
FIG. 5 is a diagram of an illustrative casing element including a surface wave detector in accordance with some embodiments.

FIG. 5 shows an example of casing element 14 including an ultrasonic surface wave touch sensor. As shown in FIG. 5, object detecting sensing cells 141 may be disposed on casing structure 141, which may form a portion of a housing or shell attached to movable parts 11 of robot 1 (FIG. 1). The vibration actuator 1421 in cell(s) 142 may be mechanically coupled to casing structure 141 so that the vibration generated by the actuator vibrates casing structure 141 itself, producing ultrasonic surface waves that are transmitted through/across casing structure 141. The receiver 1422 in cell(s) 142 may receive the transmitted ultrasonic surface waves and may convert the received ultrasonic surface wave into electrical signals.

Casing element 14 may include multiple object detecting sensing cells 142. If desired, object detecting sensing cells may be disposed/mounted in the corners of casing structure 141. This may allow cells 142 to perform detection across the lateral surface area of casing structure 141 and object detection processing module 143 may receive multiple surface wave signals from multiple receivers 1422. When external object 3 touches casing structure 141, the surface wave may be interfered, causing receiver(s) 1422 to receive interfered surface waves which may be different from the surface waves in the absence of external object 3 touching casing structure 141. Object detection processing module 143 may compare the wave pattern of the surface waves between a non-touching case and the received surface wave patterns to determine if there is touch and may additionally generate the touch position on the casing structure 141. The example shown in FIG. 5 may perform multiple touch sensing to external objects and the location or position of their touch.

Figure 6:
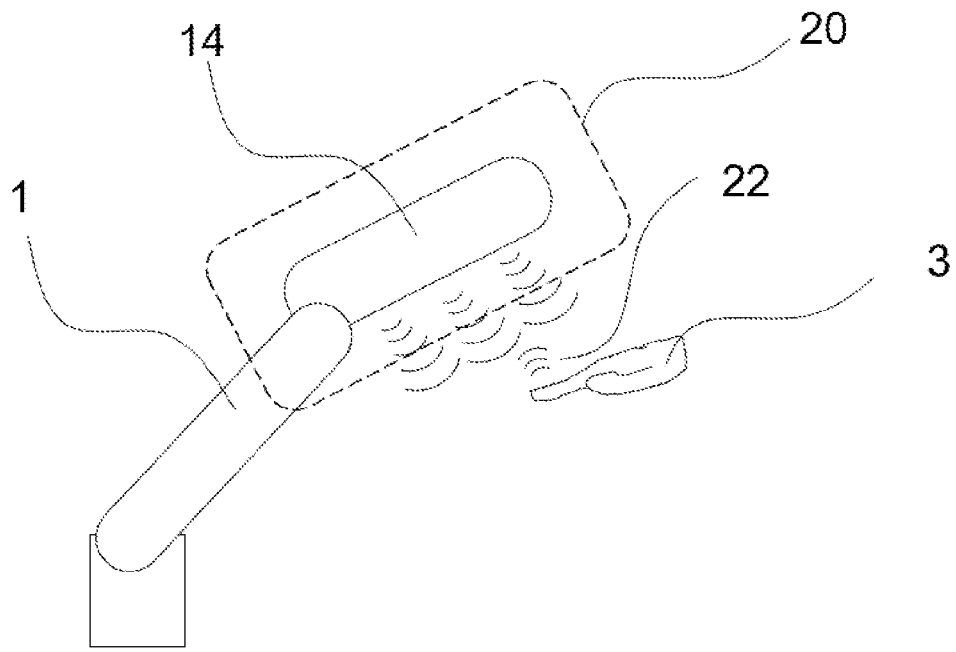
FIG. 6 is a diagram showing how an illustrative casing element can be used to stop a robot in HRC in accordance with some embodiments.
Figure 7:
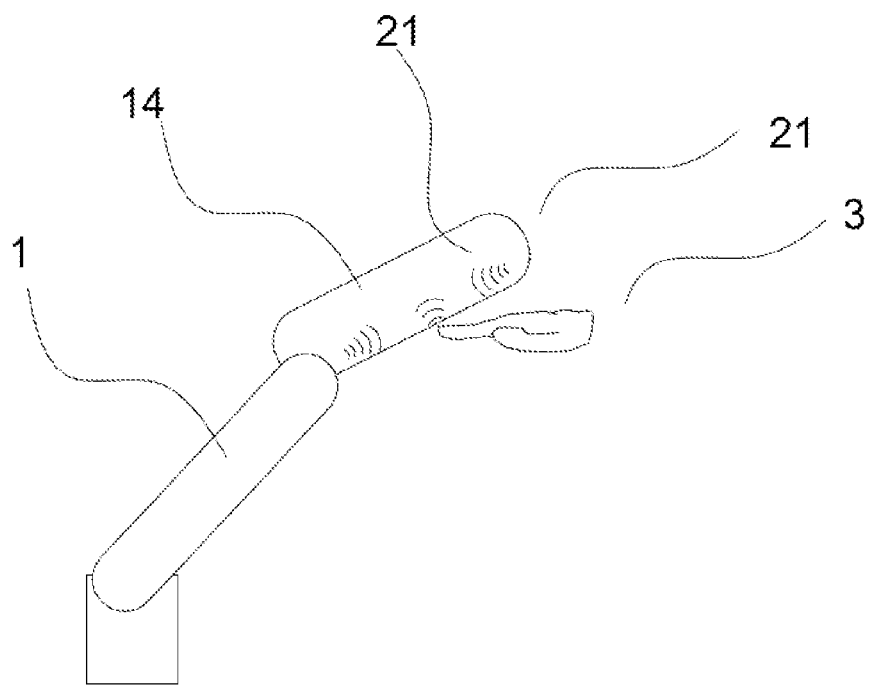
FIG. 7 is a diagram showing how an illustrative casing element including a surface wave detector can be used to stop a robot in HRC in accordance with some embodiments.

FIG. 6 and FIG. 7 show examples of how casing element 14 including a proximity sensor, for example, an ultrasonic sensor (in the example of FIG. 6) or including a touch sensor, for example, an ultrasonic surface wave touch sensor (in the example of FIG. 7), may be used to prevent or reduce harm in the event of contact or bumping between a human and robot 1 (e.g., when the human and robot are in HRC). Safety control module 132 (FIG. 1) may receive the proximity or touch sensing data from each of the casing element 14 and may monitor the data to stop the robot safely when the proximity or touch data reaches a set threshold. For example, the safety control module may cut the power of the robot's joint actuators or pass the stop signal to the motion control module to stop the robot and then monitor the standstill status of the robot through monitoring the joint position joint monitoring elements 16, for example.

Other than the bumping or clamping hazard reduction in HRC, the robot 1 may have a guiding function/guiding mode to perform an intuitive position or motion teaching process by the user, for example, a hand guiding which is using user's hand to guide, teach, or instruct the robot. In the guiding function, casing element 14 may perform the input of the guiding. For example, casing element 14 detects a certain level of proximity or touching, transmits the signal to the motion control module 131, to allow the robot to move according to the guiding action of users.

Casing element 14 may further generate haptics to assist the user in the guiding process, to improve the user experience and efficiency of the guiding. The haptics in guiding may allow the user to feel a touch feeling to serve as a physical support or the feedback to the instructing action. Casing element 14 may generate a single channel of haptic feedback, or by including multiple vibration actuators 1421, may generate multiple channels of haptic feedback to form a two-dimensional or three-dimensional haptic pattern.

Figure 8:
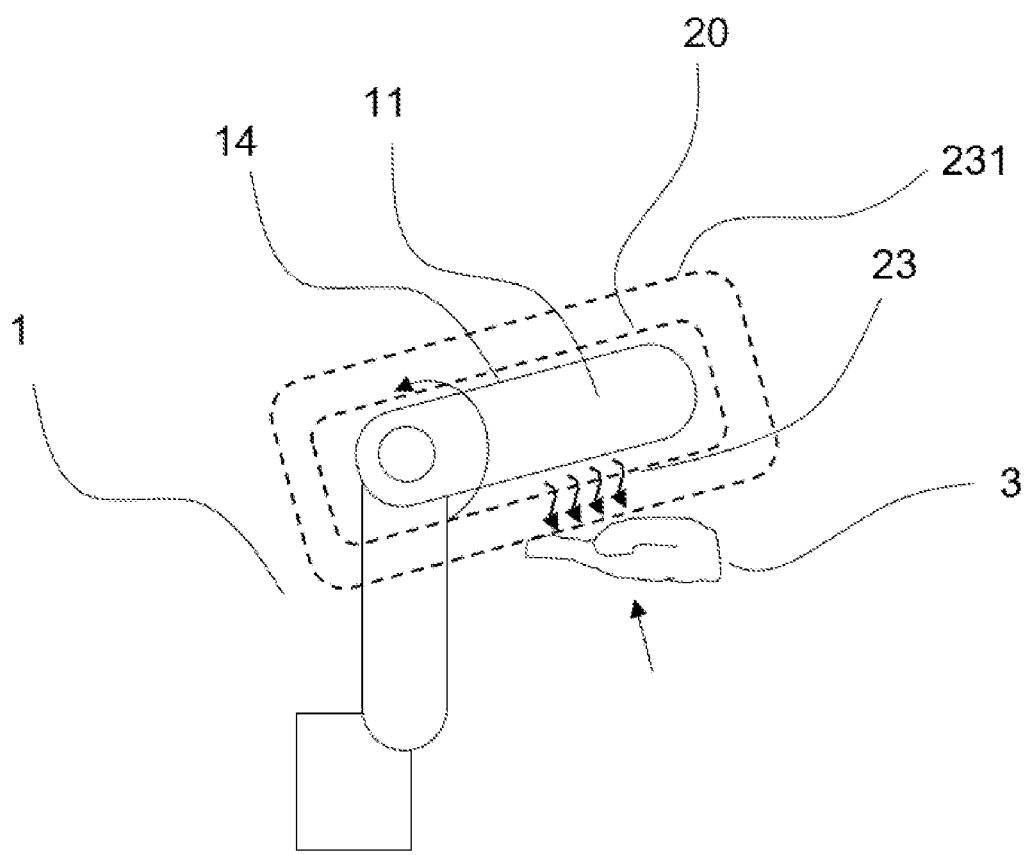
FIG. 8 is a diagram showing how an illustrative casing element can generate a haptic effect as a support in a guiding function of the robot in accordance with some embodiments.

FIG. 8 shows an example of proximity guiding of a robot with a haptic assistance. Including haptics in the guiding process may assist the user to have a better manipulation efficiency during a non-touching or proximity guiding. For example, in FIG. 8, robot 1, which includes casing element 14 on one of its movable parts 11, may be configured to drive joint actuator to rotate movable part 11 following the proximity detection signal while the user's hand (e.g., external object 3) moves into a set guiding detection range 231. Casing element 14 may generate haptic vibration 23 to assist and serve as a haptic support in this guiding operation.

For a safety consideration, the robot system may be configured to detect touch on casing element 14 or set a proximity range threshold 20 to stop the robot to prevent bumping to other objects or human parts during the guiding. For the same reason, the robot system may also limit the rotational speed of the joint actuator to a certain level. If the user is not familiar with the maximum allowed speed of the joint in a guiding mode and performs the guiding action too fast, for example, by moving his/her hand too deeply into guiding detection range 231, the user's hand may trigger the robot to stop. To prevent this kind of problem, casing element 14 may generate haptic vibration 23 with a distance in conjunction with guiding detection range 231. The haptic vibration 23 may generate a physical support feeling to assist the user to know what a suitable guiding operation distance for his/her hand is, especially when the robot is moving following his/her hand, preventing unintended triggering of the stop of the robot and allowing the robot system 1 to provide a better user experience and manipulation efficiency in proximity guiding.

Figure 9:
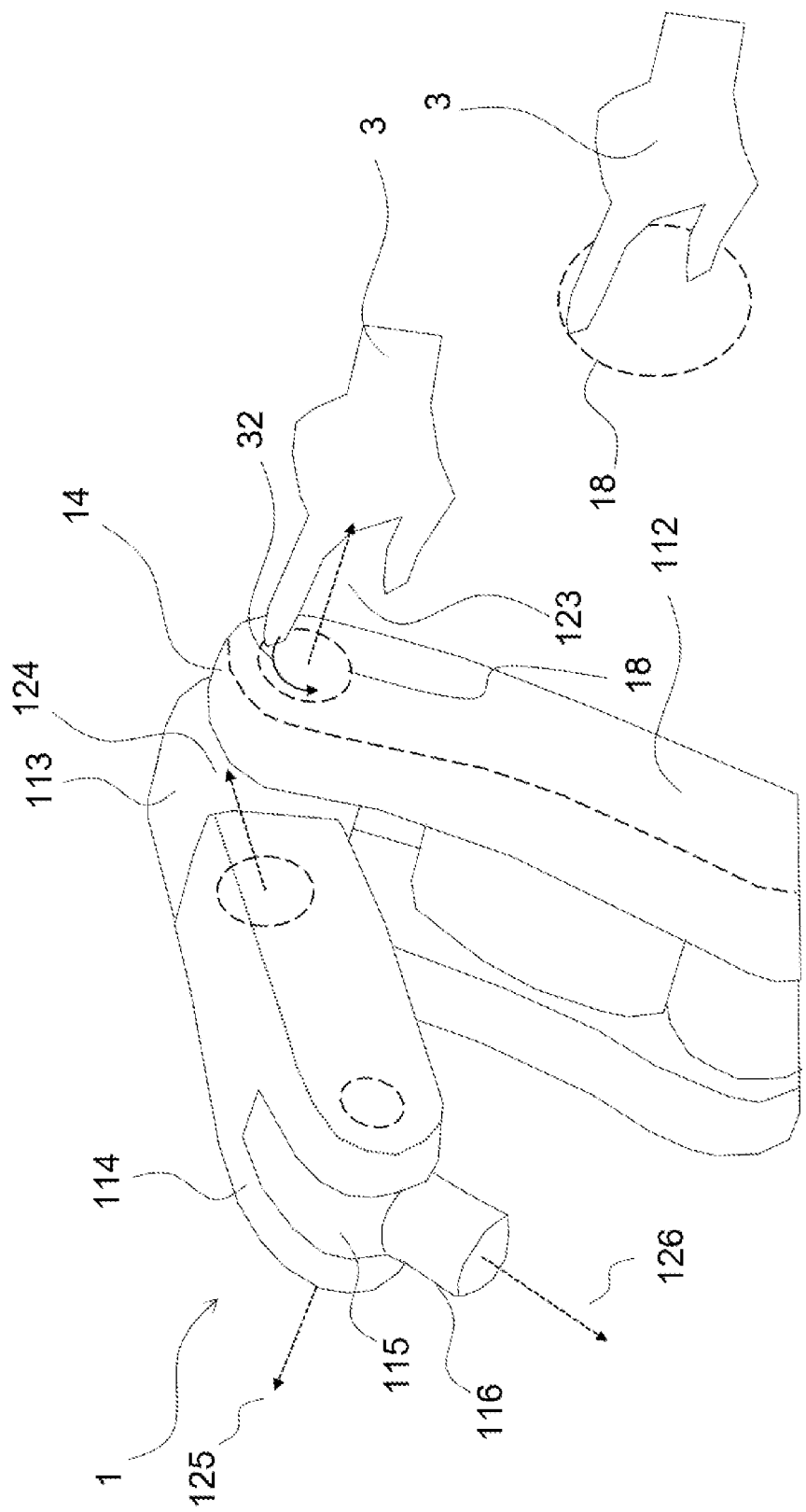
FIG. 9 is a diagram showing how an illustrative casing element can perform a two-dimensional gesture guiding and generate a haptic effect to assist a user in accordance with some embodiments.

FIG. 9 shows one example of a robot system having a haptic-assisted guiding function. Robot 1 (e.g., a six-axis articulated robot), may include movable parts 11 such as a second linkage 112, third linkage 113, forth linkage 114, fifth linkage 115, and sixth linkage 116. The linkages may be connected by joints, for example revolution joints. In the same figure, the axis of the third joint 123, axis of the fourth joint 124, axis of the fifth joint 125, and axis of the sixth joint 126 indicate the rotation axes of the joints. The robot 1 may include one or multiple casing elements 14 covering movable parts 11. The robot 1 may include a joint guiding function to allow users to instruct, guide, or jog the joints of the robot by touching the surface of the casing element 14.

The casing element 14 may include object detecting sensing cells 142 arranged in a pattern, grid, or array, and may detect the touching of the user's finger (touched or not) and the touching position of the user's finger on the surface of casing element 14. By sampling the touching signal and touching position multiple times, the robot system may recognize the touch gesture of the user and may set a circular touch gesture 32 to serve as the input of instructing the robot rotating its third joint. The robot 1 may further recognize the speed and/or the circular angle of the touch gesture 32 to determine the rotation speed and/or rotation angle of the instructed joint. If desired, the robot system may set a ratio between the circular rotation of the gesture 32 and the moving angle of the instructed joint, to perform a precise joint position adjustment function, which is similar to using a hand wheel to adjust or instruct a precision position of an axis of the machine. The casing element 14 may generate haptic pattern 18, for example, a series of dots delivering vibration arranged in a circular pattern, matching the desired guiding pattern to assist the user to perform the guiding gesture 32 correctly, and may work as feedback to the user for his/her input action, or be used to perform a stepping jog of the joint.

Figure 10:
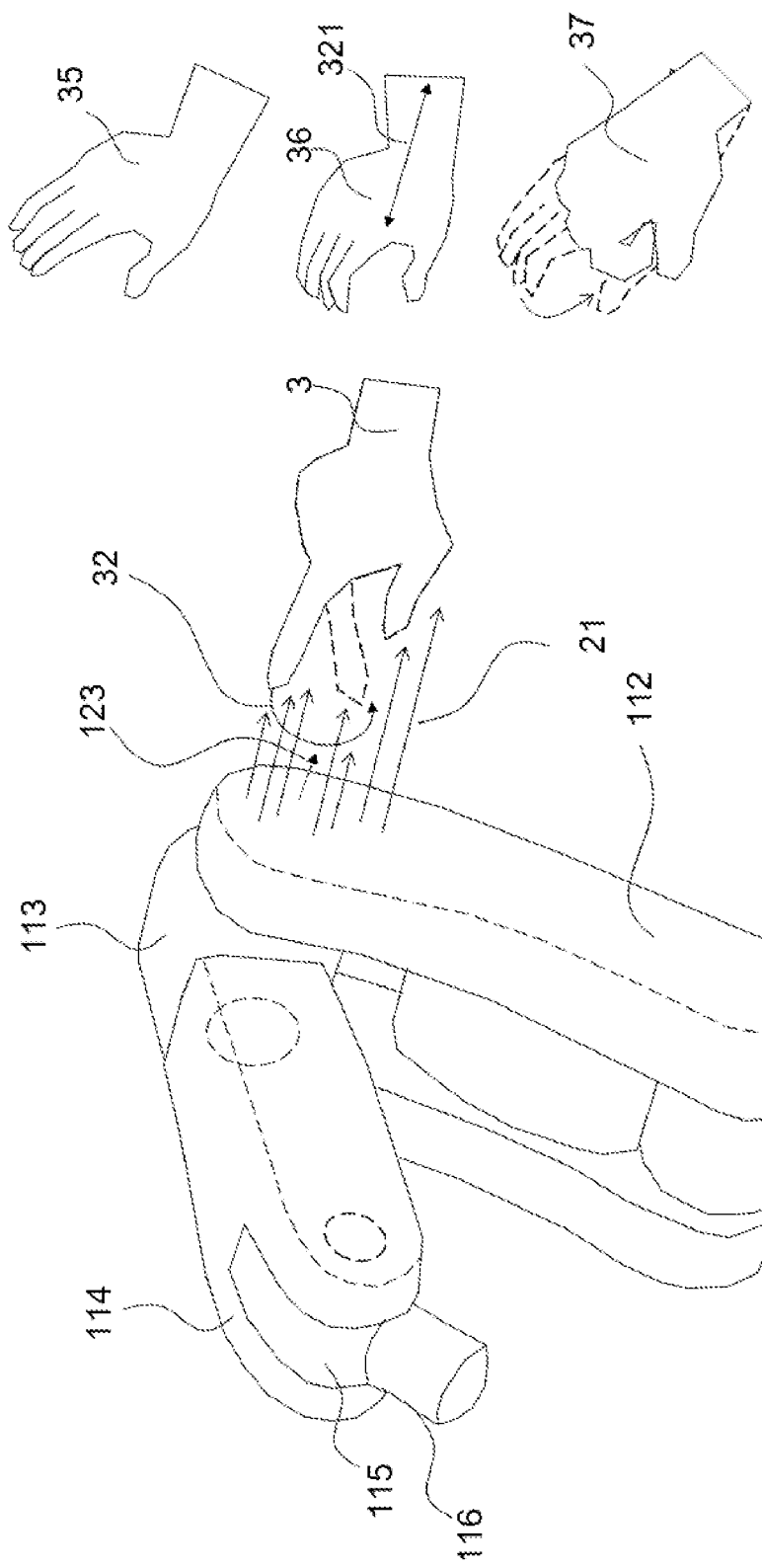
FIG. 10 is a diagram showing how an illustrative casing element can perform a three-dimensional gesture guiding and generate haptic effect to assist a user in accordance with some embodiments.

FIG. 10 shows an example of guiding the rotation of the robot's joint through a gesture 32 with a distance to the casing element 14. The casing element 14 may include object detecting sensing cells 142 arranged in a pattern, grid, or array, and may detect multiple proximity distances 21 and may generate a 3D pattern, or a point cloud of the user's hand and gesture, for example, the rotating finger to serve as the rotation control of the joint. The robot may be programmed with multiple gesture patterns to perform different kinds of instruction at the same position on the robot's body, for example, gesture 35 may be set to push the robot's linkage at the third joint and gesture 36 may be set to pull or drag the robot's linkage and set the action of the moving in the direction of leaving the robot as a stop of manipulation. The robot system may use the position of drag and/or pull to control its motion of the joint, for example, moving the axis (for example, the first joint or the second joint which may move the second linkage 112) that may move the linkage, in a conjunction of kinematics of the robot, for example, considering the distance and/or relative position of the drag/pull position to those joints. This may enlarge the flexibility and intuitiveness of the guiding.

Furthermore, the gesture 36 may be set to hold the third joint with a virtual handle, to perform a multi-directional guiding of the robot (e.g., a guiding action includes drag/push/pull/rotate), so users don't need to perform different gestures like gesture 35 and gesture 36 to serve as push/pull separately. In such a multi-directional manipulation, not like a single directional manipulation (e.g., gesture 35 may represent push and gesture 36 may represent pull), a single gesture may link the user's hand to the operational point on the robot body, to allow the robot to move accordingly and in multi-direction, so there may be the need for a separated action to indicate the stop or release of the guiding connection. If desired, the robot may be further configured to support a gesture 37, for example transfer from the original guiding gesture 36 linked with the operation point of the robot, to a holding pose, to represent stopping the manipulation, so the user can adjust the robot precisely to a desired pose and stop the manipulation to keep the well-tuned pose of the robot without needing additional actions or devices, like a hold-to-run physical or software button.

Figure 11:
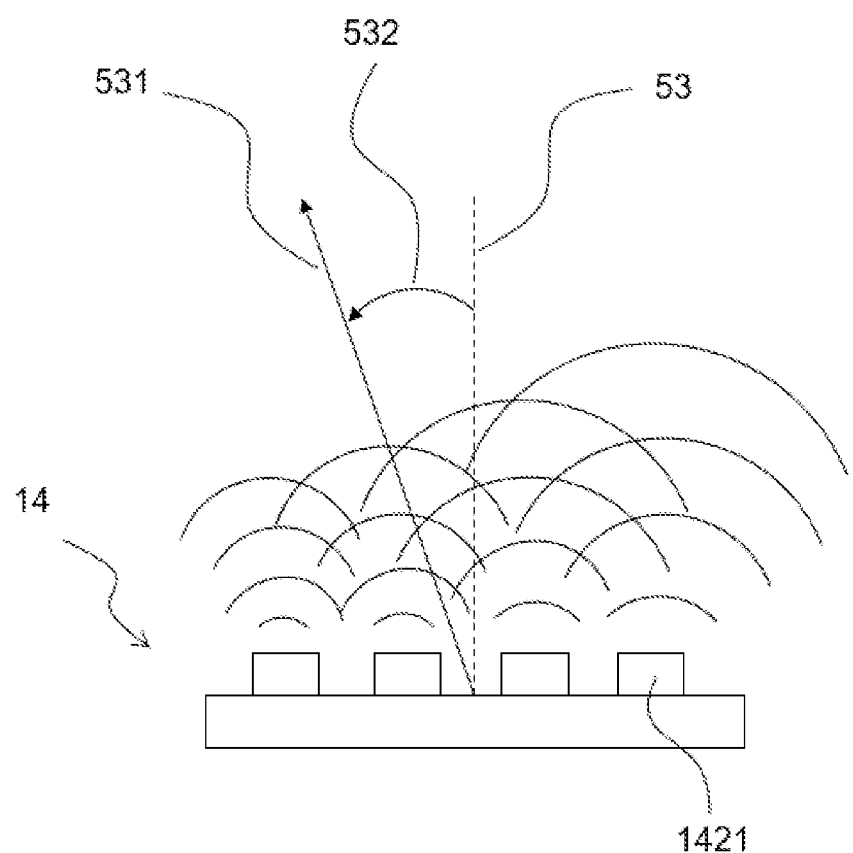
FIG. 11 is a diagram of an illustrative casing element that generates directional haptics in accordance with some embodiments.

Casing element 14 may generate a three-dimensional haptic assistance in the case of a 3D gesture guiding. FIG. 11 shows a diagram of an example of casing element 14 to generate a focus of haptics in space. Casing element 14 may modulate the vibration pattern of multiple vibration actuators 1421 that the effect of constructive interference and destructive interference between the vibration waves generate a major vibration wave along a desired direction 531, having an angle 532 to the normal direction 53. A three-dimensional angle or a space angle may be performed in a two-dimensional array of vibration actuators 1421. By continuously modulating the wave form of multiple vibration actuators 1421, the magnitude and the space angle may be controlled to generate a 3D plotted shape or volume of haptics.

Figure 12:
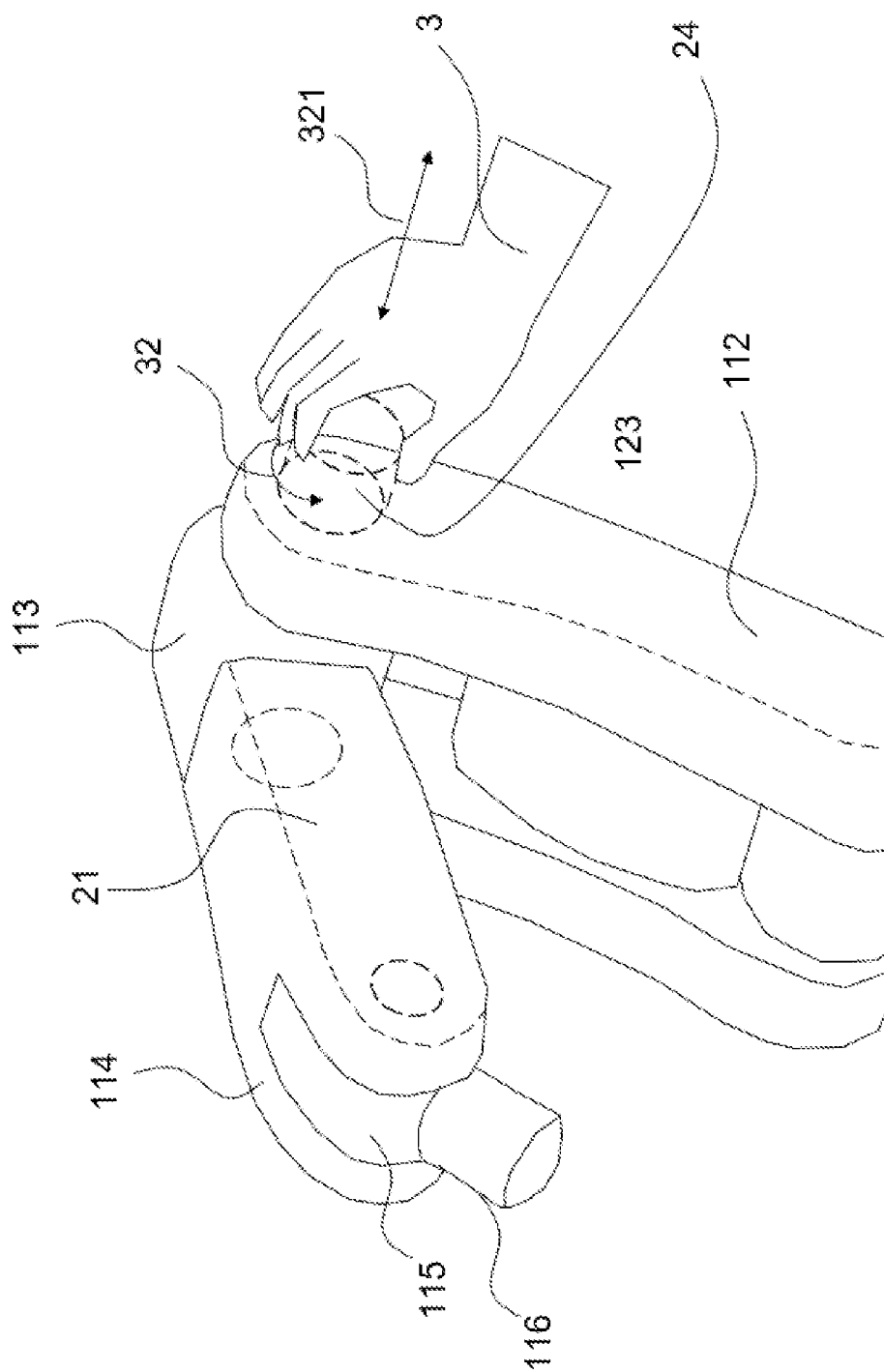
FIG. 12 is a diagram showing how an illustrative casing element can perform a three-dimensional gesture guiding and generate a three-dimensional haptic effect to assist a user in accordance with some embodiments.

FIG. 12 shows an example of robot system 1 that may include casing element 14 to generate a virtual manipulating device 24 with haptics for the user, for example, a virtual knob, a virtual handle, or a virtual six degree of freedom mouse/space mouse which may be plotted by modulating the vibration of multiple vibration actuators 1421 on casing element 14. Casing element 14 may perform gesture recognition at the same time for the input of the guiding. The user may perform the guiding more easily by feeling as if the user is manipulating the virtual manipulating device. If desired, virtual manipulating device 24 may be provided with multiple gestures and/or movements of the gesture, for example, guiding gesture or movement 321 may represent rotating the joint, guiding gesture or movement 321 may represent dragging or pulling the robot's linkage at the same position, etc. If desired, guiding gesture or movement 321 may serve as a multi-directional manipulation, the user experience being similar to grasping a handle on the robot. Because the virtual manipulating device 24 includes a haptic volume in the space for the user to hold, the robot system may be configured to recognize if the user's hand is grasping the virtual manipulating device 24 to enable or stop the manipulation. For example, in the point of view of the user, he/she may feel the haptics of virtual manipulating device 24 and grasp it to perform a precise adjustment of the robot's position to a desired pose, standstill for a whole, and releasing the fingers that are holding the virtual manipulating device 24 to represent no more manipulation. The user experience may be more intuitive than without it. There may also be a need for performing additional specific gestures to represent a stop of jog, especially for a multi-directional gesture guiding.

Figure 13:
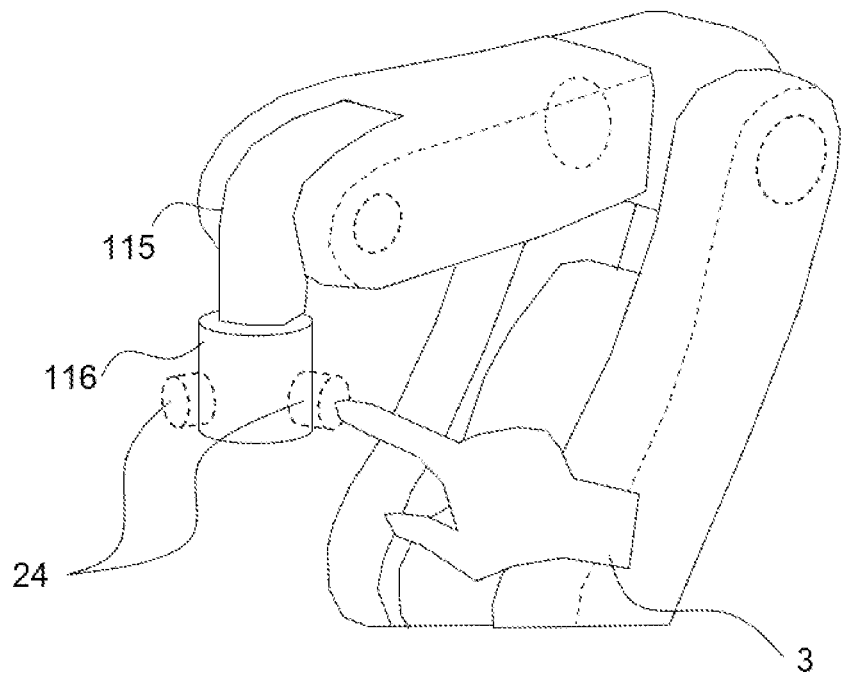
FIG. 13 is a diagram showing how an illustrative casing element can perform a tool-end guiding function in accordance with some embodiments.

FIG. 13 shows an example of a robot system that may have virtual manipulating devices 24 in the tool end for users to guide the robot. The tool end jog function in robotics, for example, a six-axis articulated robot, usually includes cartesian jog (X,Y,Z axis) and orientational jog (RX, RY, RZ axis) that represent the six degrees of freedom of the tool end. Furthermore, the coordinates for jogging or guiding the six degrees of freedom usually include robot's base coordinate (the coordinate origin is located in the base 12 of the robot), workpiece's coordinate (the coordinate defined by the user in the environmental objects), and tool coordinate (the coordinate origin is located in the tool end, and travels with the motion of the tool end). In the example shown in FIG. 13 and FIG. 14, the robot system may include multiple virtual manipulating devices 24 in the tool end, each of them may represent different axes, for example, X, Y or Z. Virtual manipulating devices 24 for X and Y may be configured as a type of knob with pressing (for X,Y cartesian jog) and/or rotating (for RX, RY orientational jog) function allowing the user to recognize the axial direction of X and Y easily. Virtual manipulating device 24 for Z axis may be configured as a ring for users to handle. Furthermore, the robot system may include visual indications 6 for virtual manipulating devices 24 and may indicate users the operational position of virtual manipulating devices 24, and the position values of the axis to assist users to adjust these axes precisely. Visual indications 6 may include display means, for example, illuminations or display elements like LCD screen module.

Figure 14:
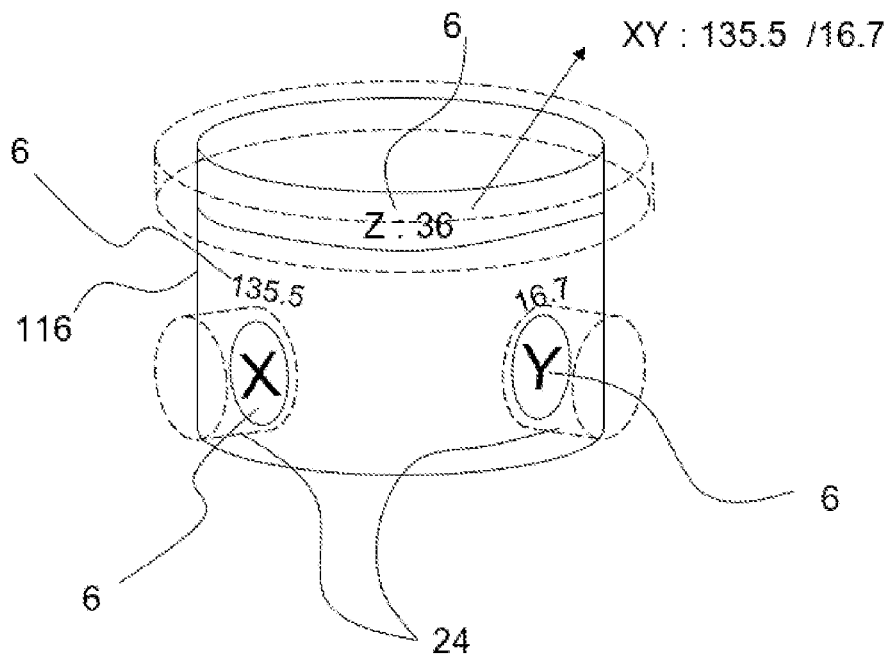
FIG. 14 is a detailed diagram showing how an illustrative casing element can perform a tool-end guiding function including visualizations in accordance with some embodiments.

FIG. 14 also shows an example that the robot system may further include a guiding function to allow parts or parts of combination of the degree of freedom to guide, for example, only motion in X-Y plane is allowed, and is a convenience function when teaching the robot in a specific plane in the working environment. The robot system may configure the ring-like virtual manipulating device 24 to perform the guiding along the X-Y plane, while the visual indication 6 may also visualize correspondence axial information to the user.

Figure 15:
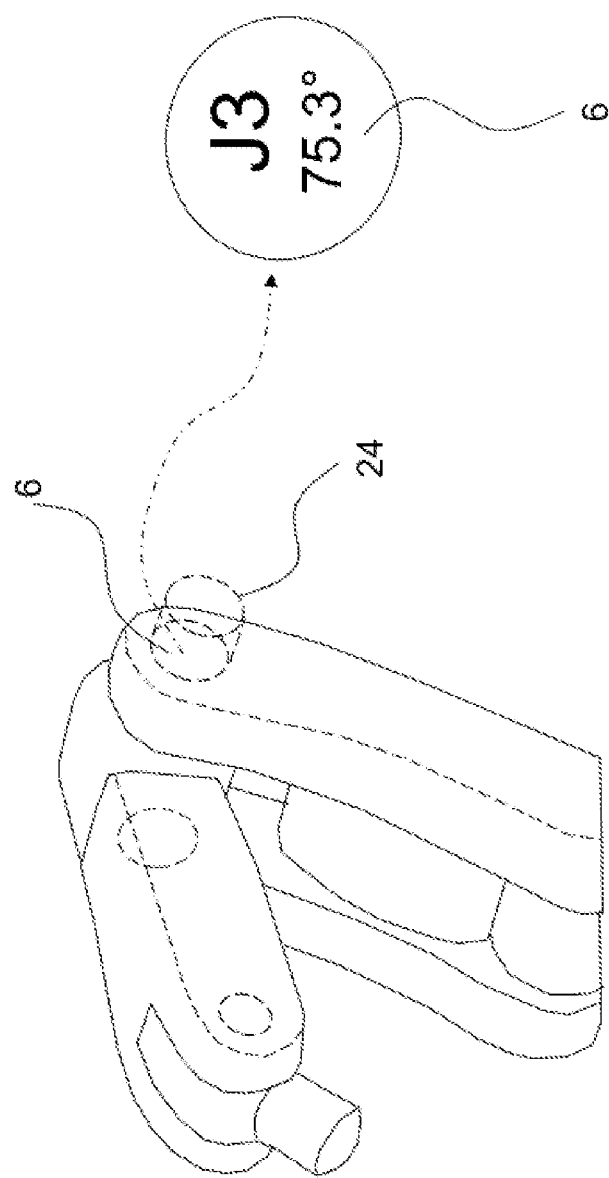
FIG. 15 is a detailed diagram showing how an illustrative casing element can generate a visualization to assist the user when guiding a joint of the robot in accordance with some embodiments.

FIG. 15 shows an example of visualization on the sensing casing element 14 for the manipulation position and value of the position of the manipulated axis, for example, the 3rd joint of the robot.

While a particular form of the invention has been illustrated and described, it will be apparent that various modifications can be made without departing from the spirit and scope of the proposed disclosure. The foregoing embodiments may be implemented individually or in any combination.

What is claimed is:

1. A robot system comprising:
   movable parts having a base and a tool end;
   an actuator configured to drive at least one of the movable parts;
   a first sensor configured to generate sensor data;
   a second sensor coupled to the actuator and configured to measure a speed of the at least one of the movable parts;
   a casing element disposed on the at least one of the movable parts, the casing element comprising a vibration actuator; and
   one or more processors configured to
      stop motion of the at least one of the movable parts when the sensor data is indicative of a force that exceeds a threshold force, and
      stop motion of the at least one of the movable parts in response to the measured speed exceeding a speed limit.

2. The robot system of claim 1, wherein the speed limit is based on the threshold force.

3. The robot system of claim 1, wherein the first sensor comprises:
   a joint current sensor,
   a joint torque sensor,
   a force-torque sensor mounted to the tool end of the movable parts,
   an ultrasonic surface wave sensor,
   a force-torque sensor mounted to the base of the movable parts,
   a proximity sensor mounted in the casing element,
   an ultrasonic sensor in the casing element,
   a pressure sensor in the casing element, or a fluid pressure sensor with a deformable structure in the casing element.

4. The robot system of claim 1, wherein the vibration actuator is configured to generate a haptic effect when the at least one of the movable parts is moving autonomously, and wherein the haptic effect is set based on the speed limit.

5. The robot system of claim 1, wherein the casing element further comprises a sensing transducer configured to generate a signal in response to an external object proximate the casing element.

6. The robot system of claim 5, wherein the one or more processors is configured to slow or stop the motion of the at least one of the movable parts when the signal identifies that the external object is within a threshold distance.

7. The robot system of claim 5, wherein the one or more processors is configured to perform a guiding function for the movable parts based on the signal.

8. The robot system of claim 7, wherein the vibration actuator is configured to generate a haptic effect in the guiding function.

9. The robot system of claim 8, wherein the vibration actuator is configured to alter a magnitude, pulse shape, or frequency of the haptic effect when the external object passes within a set range from the casing element.

10. The robot system of claim 8, wherein the vibration actuator is configured to alter a magnitude, pulse shape, or frequency of the haptic effect when the signal is indicative of the external object being within a threshold distance.

11. The robot system of claim 7, wherein the one or more processors is configured to stop the motion of the at least one of the movable parts when the sensor data is indicative of the force exceeding, during the guiding, the threshold force.

12. The robot system of claim 7, wherein the one or more processors is configured to stop the motion of the at least one of the movable parts when the signal is indicative of the external object being, during the guiding, within a threshold distance.

13. The robot system of claim 7, wherein the one or more processors is configured to identify a predetermined gesture based on the signal and is configured to control the motion of the at least one of the movable parts based on the predetermined gesture, and wherein the vibration actuator is configured to generate, based on a position for the gesture, a haptic effect comprising a two-dimensional or three-dimensional pattern in a set position overlapping the casing element.

14. The robot system of claim 7, wherein the casing element further comprises a visual indicator that is based on a position of a motion axis of the at least one of the movable parts.

15. The robot system of claim 14, wherein the guiding function further comprises a switching function between guiding coordinates and wherein the visual indicator is configured to change based on the guiding coordinates.

16. The robot system of claim 5, wherein the vibration actuator is configured to generate an ultrasonic wave and wherein the sensing transducer is configured to receive a reflected version of the ultrasonic wave that has reflected off the external object.

17. The robot system of claim 1, wherein the vibration actuator is configured to generate an ultrasonic surface wave on the casing element, the casing element further comprises an ultrasonic surface sensor configured to receive the ultrasonic surface wave through the casing element, and the one or more processors is further configured to identify a disruption to the ultrasonic surface wave from contact of an external object with the casing element.

18. A method of operating a robot system comprising:
    driving, using an actuator, at least one moveable part of the robot system, wherein the at least one movable part includes a base end and a tool end;
    generating, using a first sensor, sensor data;
    measuring, using a second sensor coupled to the actuator, a speed of the at least one movable part;
    stopping, using one or more processors, motion of the at least one moveable part responsive to the sensor data being indicative of a force that exceeds a threshold force; and
    stopping, using the one or more processors, motion of the at least one movable part responsive to the measured speed exceeding a speed limit.

19. The method of claim 18, further comprising:
    generating, using a set of vibration actuators on a casing element on the at least one movable part, vibration waves that constructively and destructively interfere in a volume of air overlapping the casing element to produce a three dimensional haptic pattern in the volume of air, wherein the three dimensional haptic pattern is configured to form a virtual manipulating device for the robot system;
    detecting, using the one or more processors, an interaction between a user and the virtual manipulating device; and
    moving, using the actuator, the at least one movable part in accordance with the detected interaction.

20. The method of claim 19, wherein the interaction comprises a grasping, by the user, of the virtual manipulating device, and wherein the virtual manipulating device comprises a virtual knob, a virtual handle, or a virtual six degree of freedom mouse formed from the three dimensional haptic pattern in the volume of air.

* * * * *